(12) United States Patent
Pietsch

(10) Patent No.: US 11,878,359 B2
(45) Date of Patent: Jan. 23, 2024

(54) WIRE SAW, WIRE GUIDE ROLL AND METHOD FOR SIMULTANEOUSLY CUTTING A MULTIPLICITY OF WAFERS FROM AN INGOT

(71) Applicant: SILTRONIC AG, Munich (DE)

(72) Inventor: Georg Pietsch, Burghausen (DE)

(73) Assignee: Siltronic AG, Munich (DE)

( * ) Notice: Subject to any disclaimer, the term of this patent is extended or adjusted under 35 U.S.C. 154(b) by 661 days.

(21) Appl. No.: 16/483,678

(22) PCT Filed: Jan. 30, 2018

(86) PCT No.: PCT/EP2018/052207
§ 371 (c)(1),
(2) Date: Aug. 5, 2019

(87) PCT Pub. No.: WO2018/149631
PCT Pub. Date: Aug. 23, 2018

(65) Prior Publication Data
US 2020/0016671 A1 Jan. 16, 2020

(30) Foreign Application Priority Data
Feb. 14, 2017 (DE) .......................... 102017202314.7

(51) Int. Cl.
*B23D 57/00* (2006.01)
*B23D 61/18* (2006.01)
*B28D 5/04* (2006.01)

(52) U.S. Cl.
CPC ..... *B23D 57/0061* (2013.01); *B23D 57/0053* (2013.01); *B23D 61/185* (2013.01); *B28D 5/045* (2013.01)

(58) Field of Classification Search
CPC ........... B23D 57/0053; B23D 57/0061; B23D 61/185; B23D 57/00; B23D 61/18; B28D 5/045; B28D 5/04; B24B 27/06
USPC ...................................... 83/764, 651; 125/21
See application file for complete search history.

(56) References Cited

U.S. PATENT DOCUMENTS

| | | | |
|---|---|---|---|
| 10,245,661 B2* | 4/2019 | Huber | .................... B65H 57/14 |
| 2007/0023027 A1* | 2/2007 | Nakai | ................. B24B 27/0633 125/21 |
| 2008/0264228 A1 | 10/2008 | Huber et al. | |
| 2009/0090344 A1* | 4/2009 | Vaubourg | ........... B23D 57/0007 125/18 |

(Continued)

FOREIGN PATENT DOCUMENTS

| | | | |
|---|---|---|---|
| CN | 102205563 A | | 10/2011 |
| CN | 103692567 A | * | 4/2014 |

(Continued)

*Primary Examiner* — Nhat Chieu Q Do
(74) *Attorney, Agent, or Firm* — BROOKS KUSHMAN P.C.

(57) ABSTRACT

A multiplicity of wafers are simultaneously cut from an ingot using a structured sawing wire having indentations and protrusions along its length, wherein the structured sawing wire is guided through grooves of two wire guide rolls, and a bottom of each groove, on which the structured wire bears, has a curved groove bottom with a radius of curvature which, for each groove, is equal to or up to 1.5 times as large as the radius of the envelope of the structured wire which the structured wire has in the respective groove.

11 Claims, 5 Drawing Sheets

(56) References Cited

U.S. PATENT DOCUMENTS

2009/0316067 A1   12/2009   Lee et al.

FOREIGN PATENT DOCUMENTS

| CN | 103692567 | A |   | 4/2014 |  |
|----|-----------|---|---|--------|--|
| CN | 106030764 | A |   | 10/2016 | |
| DE | 10237247 | A |   | 3/2004 | |
| DE | 102007019566 | A1 |   | 10/2008 | |
| EP | 2347845 | A1 | * | 7/2011 | ......... B23D 57/0053 |
| GB | 717874 |   |   | 11/1954 | |
| JP | H09254006 | A | * | 9/1997 | |
| JP | H09254006 | A |   | 9/1997 | |
| JP | 2006102917 | A |   | 4/2006 | |
| KR | 20-2010-0000195 | A |   | 1/2010 | |
| KR | 10-2016-0122795 | A |   | 10/2016 | |
| WO | 2006067062 | A1 |   | 6/2006 | |
| WO | WO-2014102662 | A1 | * | 7/2014 | ........... B23D 61/185 |

* cited by examiner

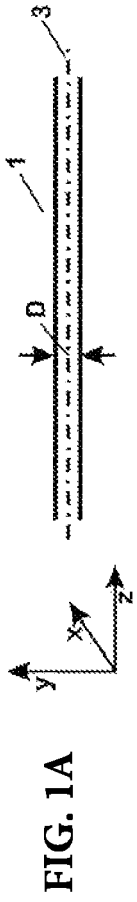
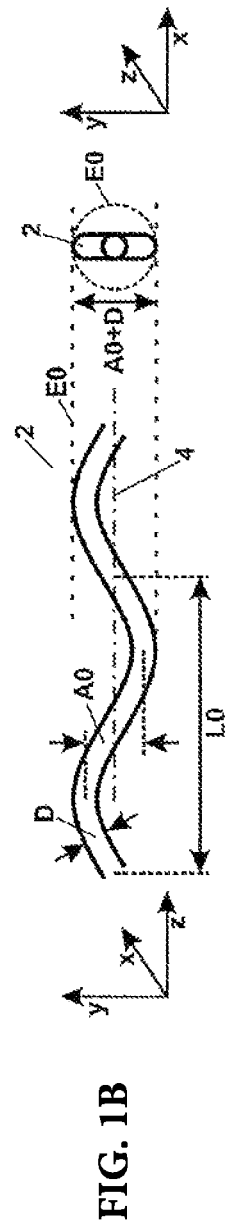
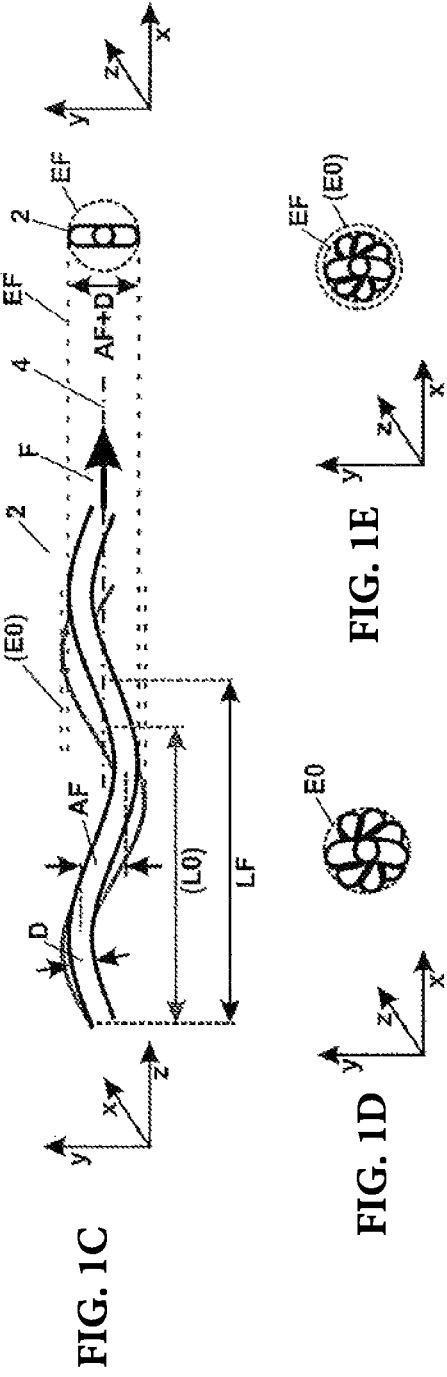
FIG. 1A
FIG. 1B
FIG. 1C
FIG. 1D
FIG. 1E

WIRE SAW, WIRE GUIDE ROLL AND METHOD FOR SIMULTANEOUSLY CUTTING A MULTIPLICITY OF WAFERS FROM AN INGOT

CROSS REFERENCE TO RELATED APPLICATIONS

This application is the U.S. National Phase of PCT Appln. No. PCT/EP2018/052207 filed Jan. 30, 2018, which claims priority to German Application No. 10 2017 202 314.7 filed Feb. 14, 2017, the disclosures of which are incorporated in their entirety by reference herein.

BACKGROUND OF THE INVENTION

1. Field of the Invention

The invention relates to a method for simultaneously cutting a multiplicity of wafers from an ingot by means of a structured wire and wire guide rolls with grooves. The invention also relates to a wire saw and to a wire guide roll.

2. Description of the Related Art

A known device for the abrasive cutting of an ingot 25 simultaneously into a multiplicity of wafers 26 comprises plain wire 27, a plurality of wire guide rolls 28, 29 and a device for moving the ingot. The wire guide rolls respectively have the shape of a right circular cylinder and respectively have axes 30, 31, about which they are rotatably mounted, and a lateral cylinder surface 32, which is provided with a multiplicity of respectively closed continuous grooves 33 within planes perpendicular to the axis at a distance from one another. The wire is guided in the grooves spirally around the wire guide rolls, in such a way that a web 34 of sections 35 of the wire extending parallel to one another and in a single plane is spanned between two of the wire guide rolls.

A method for the abrasive cutting of an ingot simultaneously into a multiplicity of wafers in the device described comprises co-rotation 36, 37 of the wire guide rolls about their axes and feeding of the ingot into (38) the web 34 by means of the device in order to move the ingot perpendicularly toward the wire web and through it, while supplying a slurry of abrasively acting hard materials in a carrier liquid 39. The rotation of the wire guide rolls about their axes in this case leads to movement of the wire sections of the web relative to the ingot. By the feeding of the ingot perpendicularly to the web, the wire sections come in contact with the ingot and, with continued feeding of the ingot, exert a force on the ingot. The hard materials, force, and relative movement lead to material erosion of the ingot, so that the wire sections work slowly through the ingot. The wire sections in this case produce cutting kerfs extending parallel to one another in the ingot, so that a multiplicity of wafers of the same shape are provided after full cutting through the ingot.

For many applications, a multiplicity of wafers of the same shape is required, with a high degree of consistency of their thickness and planarity over their entire surface, for example wafers from an ingot of monocrystalline semiconductor material as substrates for the manufacture of photovoltaic, electronic, microelectronic or micro-electromechanical components or optical substrates ("optical flats"), which should furthermore be produced particularly economically and in larger batch numbers. Abrasive wire cutting is particularly important for this.

A device and a method for abrasive wire cutting are specified, for example, in GB 717874 A.

During abrasive wire cutting, wire is moved in its longitudinal direction from a pay-off (stock, fresh wire) spool onto a take-up (reception, old wire) spool. Embodiments with movements in only one direction and movements with continual direction reversal of the movement direction are known. The movements may be carried out with variable speeds. Abrasive wire cutting with wire movement in only one direction is referred to as unidirectional sawing, while abrasive wire cutting with a continual direction reversal is referred to as sawing in the "reciprocating movement" method or "pilgrim-step" mode.

During abrasive wire cutting, the wire is subject to wear. Its diameter in this case decreases when passing through the wire web from the fresh wire supply side (fresh wire spool) to the old wire discharge side (old wire spool). Because of the decrease of the wire diameter due to wear, with the same spacing of the wire guide grooves on the wire guide roll, the thickness of the wafers obtained by cutting the ingot increases from the fresh wire side to the old wire side.

In order to compensate this, according to DE 102 37 247 A1, the spacing between two grooves on the wire guide roll is intended to be reduced from the wire entry side to the wire exit side. Because of the reduced groove spacing, despite a thinner sawing wire, uniformly thick wafers can be cut from the workpiece.

One essential element of a wire saw is the wire guide roll. This is a roller-shaped body made of steel or composite plastics, the functional surface of which usually forms the shape of a right circular cylinder. The functional surface conventionally comprises a coating of a tough wear-resistant plastic, usually polyurethane, in particular thermosetting polyurethane. The polyurethane layer is provided with grooves which receive and guide the wire.

A groove comprises a groove bottom and groove sides. The wire bears on the groove bottom, and the groove side "captures" the wire when it enters and centers it in the groove, so that it does not jump into one of the neighboring grooves. Wire guide rolls with V-shaped grooves are known in the prior art, for example from JP 2006102917 A.

Furthermore, wire guide rolls which have a curved groove bottom are known. DE 102007019566 A1 discloses a wire guide roll for use in wire saws for simultaneously cutting a multiplicity of wafers from a cylindrical workpiece, which is provided with a coating, which has a thickness of at least 2 mm and at most 7.5 mm and consists of a material that has a Shore A hardness of at least 60 and at most 99, which furthermore contains a multiplicity of grooves through which the sawing wire is guided, the grooves respectively having a curved groove bottom with a radius of curvature which is given by 0.25-1.6 times a sawing wire diameter D, and having an aperture angle of 60-130°. This invention therefore describes grooves whose groove bottom may be both narrower, and also equal to or wider than the sawing wire. Optimal guiding of the wire is ensured by the special groove shape, which improves the cutting quality. The wear of the wire guide roll is minimized by the hardness and thickness of the coating.

The wire guide rolls known from the prior art relate to the use of straight or plain wire. This refers to the volume of a general cylinder of steel, metal or plastic with very great height. The height of this cylinder is referred to as the wire longitudinal direction, and the base surface as the wire cross section. Plain wires with a circular cross section, which are referred to as round plain wire, in particular those which consist of steel ("piano wire"), are important.

Besides plain wire, however, the use of structured wire may also be envisioned.

A structured wire is intended to mean a plain wire which has been provided along its longitudinal axis with a multiplicity of indentations and protrusions of its cross section in directions perpendicular to the wire longitudinal axis, or with a multiplicity of variations of its cross-sectional area in terms of size and shape.

Structured wires made of plain round steel wires with cross sections displaced by equal amounts perpendicularly to the wire longitudinal direction periodically along their entire length without variation of shape and size of their cross-sectional area are of particular importance. These displacements are often referred to as "crimps", the magnitude of the displacement as the amplitude of the crimps, and the length in the longitudinal direction between two displacements as the wavelength. The plain wire on which a structured wire is based is also referred to as the "core wire" of the structured wire.

An example of a structured wire, which is provided with crimps in two planes perpendicular to its longitudinal direction, respectively with an amplitude and a wavelength, is given by WO 2006/067062 A1.

The intermediate spaces between the crimps act as "pockets" or "reservoirs", in which more slurry can be carried along by the wire during movement of the wire in the wire longitudinal direction without being wiped off, than is possible with a plain wire of comparable diameter. A structured wire therefore has better transport of the applied abrasive slurry, even over large engagement lengths of the wire with the ingot, than a plain wire.

For this reason, the use of structured wire would in principle be desirable.

The inventor has, however, discovered that the wire guide rolls and groove shapes known in the prior art are unsuitable for a method for the abrasive cutting of an ingot by means of a structured wire.

On the one hand, wire breakages are often observed because of bent or overloaded wires. Wire breaks are undesirable, since they interrupt the cutting process, and only with great outlay can they be repaired and the interrupted cutting process continued, and the wafers obtained then have undesired waviness or nonuniform thicknesses. Furthermore, it has been possible to remove the wire sections remaining in the broken wire web only with difficulty from the guide grooves.

In other cases, the use of structured wire on conventional wire guide rolls has led to wafers with wavy front and rear sides. Such wafers, with thicknesses and planarities varying over their surface, are unsuitable as substrates for electronic components.

During abrasive cutting with structured wire, particularly high and rapid wear of the grooves formed according to the prior art in the polyurethane coatings of the wire guide rolls has also been observed (grooves cut into deeply or widened irregularly), which have rapidly led to wafers of very poor planarity and thickness. This entails high costs because of frequently required replacement and processing of the wire guide rolls (grinding back and regrooving) and rejections of wafers with planarities and thicknesses outside the stringent requirements.

The object of the present invention is to provide a method for the abrasive wire cutting of an ingot simultaneously into a multiplicity of wafers by using a structured wire, wire guide rolls with grooves and a slurry, in which the structured wire does not break, the grooves have low wear, and wafers with good planarity and uniformity of their thickness are obtained.

SUMMARY OF THE INVENTION

The forgoing object and others are achieved by a method for simultaneously cutting a multiplicity of wafers from an ingot, by the ingot being moved through a wire web of structured sawing wire, which is spanned by two co-rotating wire guide rolls, while a slurry is applied to the wire web, wherein the structuring of the wire consists of a multiplicity of indentations and protrusions of a plain core wire perpendicular to the longitudinal direction of the core wire, wherein the structured sawing wire is guided through grooves of the two wire guide rolls, and wherein the bottom of each groove, on which the structured wire bears, is curved with a radius of curvature which for each groove is equal to the radius of the envelope of the structured wire or up to 1.5 times as large as the radius of the envelope of the structured wire which the structured wire has in the respective groove.

The invention also relates to a wire guide roll for use in a wire saw for simultaneously cutting a multiplicity of wafers from an ingot, comprising a multiplicity of grooves through which structured sawing wire is guided, each groove respectively having a curved groove bottom with a radius of curvature which is given by 1-1.5 times a radius of the envelope of the structured sawing wire in the respective groove.

The objects are also achieved by a wire saw for simultaneously cutting a multiplicity of wafers from an ingot, containing two wire guide rolls according to the invention, wherein the structured wire is guided spirally under a tension acting perpendicularly to the bottom surface of its envelope in the grooves around the two wire guide rolls in such a way that a plane wire web of sections of the wire extending parallel to one another is formed between the two wire guide rolls, furthermore comprising a feed device for moving the ingot perpendicularly toward the plane of the wire web and through the wire web.

BRIEF DESCRIPTION OF THE DRAWINGS

FIGS. 1A TO 1E show a round plain wire (FIG. 1A), a structured wire (FIG. 1B), a structured wire under the influence of a tensile force (FIG. 1C), a structured wire with torsion (FIG. 1D) and a structured wire with tensile force and torsion (FIG. 1E).

DETAILED DESCRIPTION OF THE PREFERRED EMBODIMENTS

Figure 2:
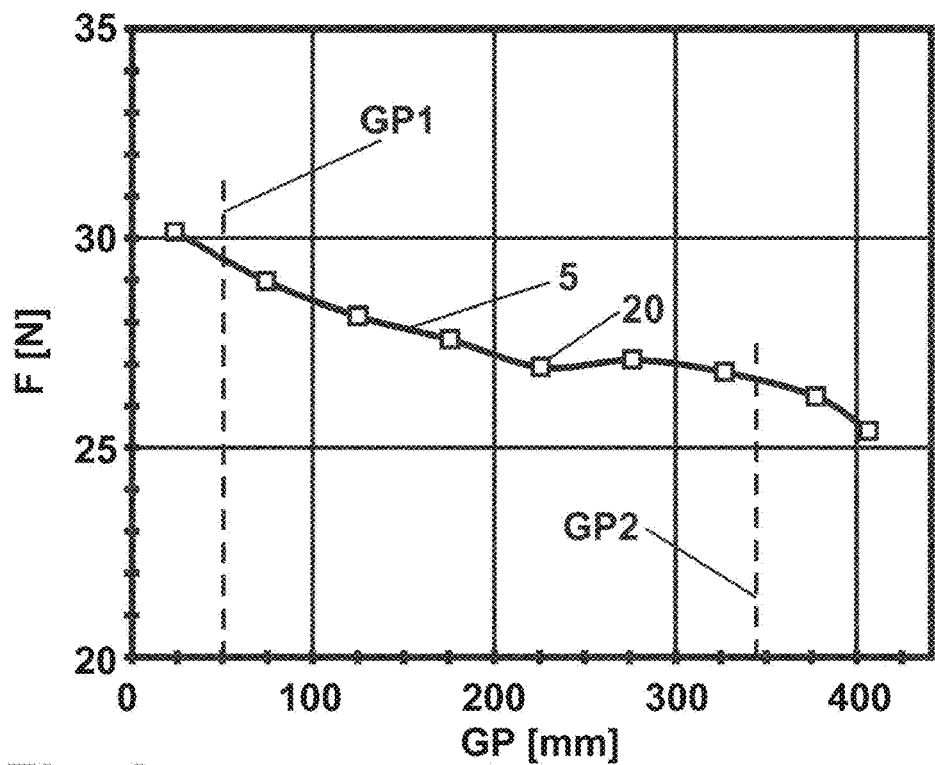
FIG. 2 shows a measurement curve of the tensile force measured in the wire web against the position of the respectively measured wire section in the web.

In one embodiment, the structuring of the wire consists of a multiplicity of indentations and protrusions of a plain wire (referred to below as the core wire) perpendicular to the longitudinal direction of the plain wire.

For a structured wire, the envelope is defined as that right circular cylinder of the smallest diameter which fully contains the entire structured wire. The base surface of this right circular cylinder is referred to as the effective cross section, the diameter of the base surface of the cylinder as the effective diameter of the structured wire, and the longitudinal axis of the envelope of the cylinder as the longitudinal axis of the structured wire.

Preferably, the diameter of the core wire is from 130 μm to 175 μm.

Preferably, the diameter of the envelope of the structured wire is from 1.02 to 1.25 times the diameter of the core wire.

A defined variable groove width, defined in the scope of the invention by the radius of curvature of the groove bottom, is an essential feature of the invention.

If the grooves are narrower than the respective effective diameter of the wire, the wire can become quite buried in the grooves and, during rotation of the wire guide rolls, can irregularly (jerkily, sticking) enter the grooves and emerge from them again. This leads to the observed wire breakages. Furthermore, the wire sections remaining in the wire web can be removed with difficulty. In the case of plain wires, which may likewise break, removal of the remaining wire turns—starting from the broken positions—is on the other hand achieved easily and usually automatically by their being separated from the grooves as a result of the wire bending tension.

If the grooves are wider than the respective effective diameter of the wire, this leads to wafers with poor geometry. The wire rolls to and fro in an excessively wide groove because of its structuring, which leads to poor wire guiding with correspondingly warped cutting planes.

What is crucial for the success of the invention is the discovery that structured wire behaves in a fundamentally different way than plain wire.

Plain wire is subject to a uniform thickness reduction because of material erosion (wear).

Structured wire, on the other hand, is subject to nonuniform wear depending on the wire shape and degree of use.

The effective diameter of the structured wire initially decreases rapidly, and then more slowly with an increasing degree of wear. The wire wears isotropically and homogeneously over the entire surface of the core wire on which the structured wire is based. Furthermore, an anisotropic wear is found in the region of the exposed "tips" of the crimps (the wire becomes oval there).

For particularly good cutting outcomes, the groove shape for each groove must be configured in such a way that the required condition is satisfied for each turn, i.e. for each effective diameter there, determined by the wire tension there and the degree of wear there.

A structured wire is characterized by its effective diameter. The effective diameter is determined, on the one hand, by the wire tension. Structured wire acts like a coil spring, the diameter of which likewise decreases with the increasing tensile stress in the spring axis direction and increases with a decreasing tension.

In addition, the effective diameter of the structured wire is determined by the instantaneous state of wear.

The degree of wear depends on the cumulative engagement length of the wire with the ingot which has been travelled, the length of the sawing wire used per ingot cutting volume, and properties of the wire such as hardness (carbon content), strength (due to specifics of the wire production, for example degree of cold hardening in the last wire drawing step), etc.

The invention relates to a method for simultaneously cutting a multiplicity of wafers from an ingot by means of a structured wire. The wire saw comprises, in a manner known per se, wire guide rolls having axes and grooves and a feed device. A slurry of abrasively acting hard materials in a liquid carrier is furthermore supplied.

Preferably, the slurry contains hard materials selected from the group consisting of silicon carbide (SiC), silicon nitride ($Si_3N_4$), silicon dioxide ($SiO_2$), boron carbide ($B_4C$), boron nitride (BN) and diamond.

In particular, glycol or oil is suitable as a carrier liquid.

Preferably, the structured wire is guided spirally under a tension acting perpendicularly to the bottom surface of its envelope in the grooves around the wire guide rolls, in such a way that a plane web of sections of the wire extending parallel to one another is formed between two of the wire guide rolls.

In the scope of the invention, the term wafer refers to a general cylinder having a height which is small compared with the diameter of its base surface. The cylinder base surface of a wafer is also referred to as the back side, and the cylinder top surface as the front side of the wafer. A general cylinder refers to the volume which is swept over by an arbitrary plane curve, which forms the base surface of the cylinder, when displaced through a fixed distance (height). The top surface of a general cylinder in this case refers to the surface into which the base surface is translated by displacement over the height.

One embodiment involves ingots in the form of a cylinder with polygonal or circular base surfaces, in particular ingots with square, octagonal or circular base surfaces. A cylinder with a polygonal base surface is also referred to as a prism.

In another embodiment, the ingots are made of monocrystalline or polycrystalline semiconductor material.

Examples of semiconductors are elemental semiconductors consisting of silicon, germanium or silicon carbide, or compound semiconductors consisting of gallium arsenide and other elements of groups III and V of the periodic table. Examples of prismatic ingots are ingots of monocrystalline or polycrystalline silicon, from which wafers for the production of photovoltaic cells are produced by abrasive cutting.

One embodiment involves an ingot of monocrystalline silicon, from which so-called "wafers" have been produced by means of abrasive cutting as substrates for the structuring of electronic, microelectronic or micro-electromechanical elements. Particularly stringent requirements are placed on such substrates in terms of their plane-parallelism of the front and back sides.

Wafers of monocrystalline semiconductor material produced by means of abrasive wire cutting as substrates for electronic components often need to have a particular crystallographic orientation. By processing for controlled removal of material before the abrasive wire cutting, a right circular-cylindrical ingot, the axis of which corresponds to the desired crystallographic orientation of the wafers, is often formed from the larger and irregularly shaped raw crystal. The ingot axis is therefore preferably aligned parallel with the axes of the wire guide rolls.

As an alternative, a right circular-cylindrical ingot with a desired crystallographic orientation other than that for the wafers obtained after abrasive cutting may also be formed from a raw crystal, and the ingot axis is then oriented at an angle to the axes of the wire guide rolls, in such a way that the wafers obtained after cutting then have the desired orientation. According to another embodiment, therefore, the ingot axis has an angle relative to the axes of the wire guide rolls during the abrasive wire cutting.

In one embodiment, the structuring of the wire consists of a multiplicity of indentations and protrusions of a core wire, without varying the cross sectional area of the core wire in terms of shape or size.

In one embodiment, the structured wire has, on average over its longitudinal direction, indentations and protrusions which extend within all (arbitrary) planes perpendicular to the longitudinal direction.

One embodiment involves a structured wire with torsion. Torsion refers to twisting of the wire about its longitudinal direction.

In this case, in one embodiment, the indentations and protrusions pointing on average over its longitudinal direction in all (arbitrary) planes perpendicular to the longitudinal direction are formed by means of structuring of the core wire in a plane perpendicular to the longitudinal direction and subsequent torsioning (twisting) of the structured wire about the longitudinal axis of the structured wire, so that the twisted structured wire resulting in this way has the shape of a helix (cylindrical spiral, coil).

In one embodiment, the structuring on average over the longitudinal direction of the wire in all (arbitrary) planes perpendicular to the longitudinal direction is formed with a first amplitude and a first wavelength structured in a first plane perpendicular to the wire longitudinal direction, and with a second amplitude and a second wavelength structured in a second plane perpendicular to the wire longitudinal direction and perpendicular to the first plane, and subsequent torsioning of the thus structured wire about its longitudinal axis.

In one embodiment, the radii of curvature of the grooves do not decrease strictly monotonically with the position of the groove in the wire web from the fresh wire entry side to the old wire exit side. This takes into account the nonuniform wear of the structured wire.

By co-rotation of the wire guide rolls about their axes and supply of the slurry onto the wire web, movement of the ingot by means of the feed device perpendicularly toward the plane of the wire web, and bringing the ingot in contact with the wire sections of the web while supplying the slurry and rotating the wire guide rolls, the ingot is cut through fully by further movement of the ingot perpendicularly toward the plane of the wire web and through the latter with continued supply of slurry and rotation of the wire guide rolls.

In one embodiment, the movement of the wire consists in a continuous progression of pairs of direction reversals, wherein a pair of direction reversals respectively comprises a first movement of the wire in a first direction in the wire longitudinal direction over a first length and a subsequent movement of the wire in a second direction, exactly opposite to the first direction, over a second length, and wherein the first length is selected to be greater than the second length. This will be referred to below as the reciprocating method or "pilgrim-step" mode.

Because of the approximate symmetry of the alternating direction of the wire movement, wafers with significantly reduced wedging are formed during abrasive wire cutting by the reciprocating method. The main advantage of abrasive wire cutting by reciprocating movement is, however, that slurry of hard materials leading to the material erosion only needs to be transported as far as the middle of the ingot on account of the continuous reversal of direction of the wire movement. Ingots with very large maximum engagement lengths of the wire with the ingot can therefore also be cut, for example ingots of monocrystalline semiconductor material with a diameter of 300 mm or 450 mm.

In one embodiment, the wire is fed to the wire web from a wire stock with a first tensile force in the wire longitudinal direction during the movement in the first direction over the first length, and is fed to the wire web from a wire stock with a second tensile force in the wire longitudinal direction during the movement in the second direction over the second length.

In one embodiment, the ratio of the second tensile force to the first tensile force is selected to be equal to the ratio of the smallest cross-sectional area of the core wire in the wire section which leaves the wire web during the first movement in the first direction, and the greatest cross-sectional area of the core wire in the wire section which is fed from the wire stock to the wire web during the first movement in the first direction.

In one embodiment, the ratio of the second tensile force to the first tensile force is selected to be equal to the ratio of the cross-sectional area of the envelope of the wire section which leaves the wire web during the first movement in the first direction, and the cross-sectional area of the envelope of the wire section which is fed from the wire stock to the wire web during the first movement in the first direction.

The manufacture of the wire guide rolls, or the grooving of the wire guide rolls, is carried out in a manner known per se by means of a grinding tool or lathe tool which is thinner than the groove to be made, and which moves according to the required respective groove contour.

The required groove width (radius of curvature of the groove bottom) varies with the variation of the wire tension, the choice of wire material (strength) and, in particular, with the length of the wire used per ingot cutting volume.

It was already known from the prior art to reduce the groove spacing in order to compensate for the wire diameter decreasing with an increasing web position because of wear. During manufacture of the wire guide roll according to the invention, the groove width for each individual web position is furthermore selected in such a way that it matches the effective diameter of the structured wire used, taking into account the wire length and the wire tension, i.e. for each groove the radius of curvature of the groove bottom corresponds to 1-1.5 times the effective diameter of the structured sawing wire in the groove.

LIST OF REFERENCES USED 1 plain wire;
2 structured wire;
3 longitudinal axis of the plain wire;
4 longitudinal axis of the envelope of the structured wire;
5 measurement curve of the tensile force against the web position;
6 depth of the groove at web position GP1;
7 depth of the groove at web position GP2;
8 measurement curve of the diameter of the envelope against tensile force;
9 groove at web position GP1;
10 groove at web position GP2;
11 aperture angle of the groove at web position GP1;
12 aperture angle of the groove at web position GP2;
13 plane/closest point of the wire surface to the ingot;
14 wire guide roll;
15 groove side;

16 groove bottom;
17 diameter of the envelope against web position;
18 regression line for old (worn) structured wire;
19 regression line for fresh structured wire;
20 minimum of the curve profile of tensile force against web position;
21 axis of the wire guide roll;
22 lateral cylinder surface of the wire guide roll;
A0 amplitude of the structure without tensile force;
AF amplitude of the structure with tensile force F;
diameter of the plain wire;
E diameter of the envelope;
E0 diameter of the envelope without tensile force;
EF diameter of the envelope with tensile force F;
EF1 diameter of the envelope with tensile force F1;
EF2 diameter of the envelope with tensile force F2;
F force;
GP web position;
GP1 web position 1;
GP2 web position 2;
L0 wavelength of the structure without tensile force
LF wavelength of the structure with tensile force F
x direction perpendicular to the longitudinal direction and to the y axis
y direction perpendicular to the longitudinal direction and to the x axis
z direction of the longitudinal direction In one embodiment, the smallest distance of each groove from the axis 21 of the wire guide roll 14 is selected in such a way that all points of the envelope with the greatest distance from the axis 21 of the wire guide roll 14 in each groove have the same distance from the axis 21 of the wire guide roll 14.

The features indicated in relation to the embodiments of the method according to the invention which were mentioned above may be applied correspondingly to the device according to the invention. Conversely, the features indicated in relation to the embodiments of the device according to the invention which were mentioned above may be applied correspondingly to the method according to the invention. These and other features of the embodiments according to the invention will be explained in the description of the figures and in the claims. The individual features may be implemented either separately or in combination as embodiments of the invention. Furthermore, they may describe advantageous embodiments which are independently protectable.

Because of the "pockets" or "reservoirs" formed by its crimps, a structured wire has better transport of the applied abrasive slurry, even over large engagement lengths of the wire with the ingot, than a plain wire, from which the majority of the slurry on the lateral ingot surface is wiped off when entering the cutting kerf. Abrasive wire cutting with structured wire is therefore suitable particularly for cutting ingots with large diameters, for example ingots of monocrystalline silicon with a diameter of 300 mm or 450 mm. The structured wire also allows higher cutting speeds and therefore shortened times for full cutting of the ingot into wafers. This is particularly economical, and therefore advantageous. Lastly, the improved transport of the slurry leads to an improved quality of the cutting, with wafers which have a smoother surface and a particularly planar shape.

FIG. 1A shows a round plain wire 1 with a diameter D and a mid-axis 3, along which the wire longitudinal direction extends. The coordinate system indicates the respective viewing direction: z denotes the wire longitudinal direction, and x and y denote the two wire transversal directions.

FIG. 1B shows a structured wire 2 based on a plain wire 1 (core wire) with diameter D, which without tensile force in the wire longitudinal direction has structuring with an amplitude A0 and a wavelength L0. The diameter of the envelope, E0, is given by the core wire diameter D and the amplitude A0, E0=A0+D. In the example shown, the structuring consists of a displacement of the cross sections of the plain wire 1 in the transverse direction y. The axis of the envelope E0 refers to the longitudinal axis 4 of the structured wire 2. View on the one hand on the y/z plane (left) and on the other hand on the x/y plane (right).

FIG. 1C shows the structured wire 2 of FIG. 1B under the influence of a tensile force F in the longitudinal direction 4 with reduced amplitude AF and increased length LF of the structuring. The envelope EF under tensile force F is given by EF=AF+D. View on the y/z plane (left) and the x/y plane (right).

FIG. 1D shows the structured wire 2 of FIG. 1B without tensile force after additional torsioning (twisting) of the structured wire about the z axis (longitudinal direction of the structured wire 2).

FIG. 1E shows the structured wire 2 of FIG. 1C under tensile force F after additional torsion (twisting) of the structured wire 2 about the z axis (longitudinal direction of the structured wire 2). Compared with FIG. 1D (no tensile force), the diameter of the envelope EF under a tensile force F smaller relative to the envelope E0 without tensile force.

Figure 5:
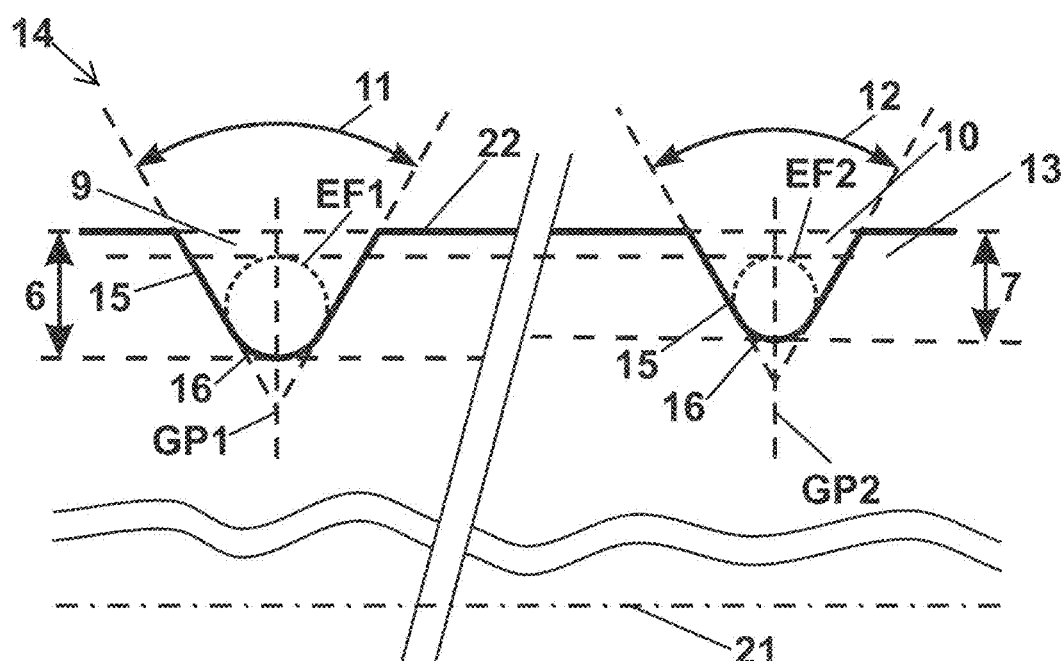
FIG. 5 shows a detail of a wire guide roll at two web positions.
Figure 6:
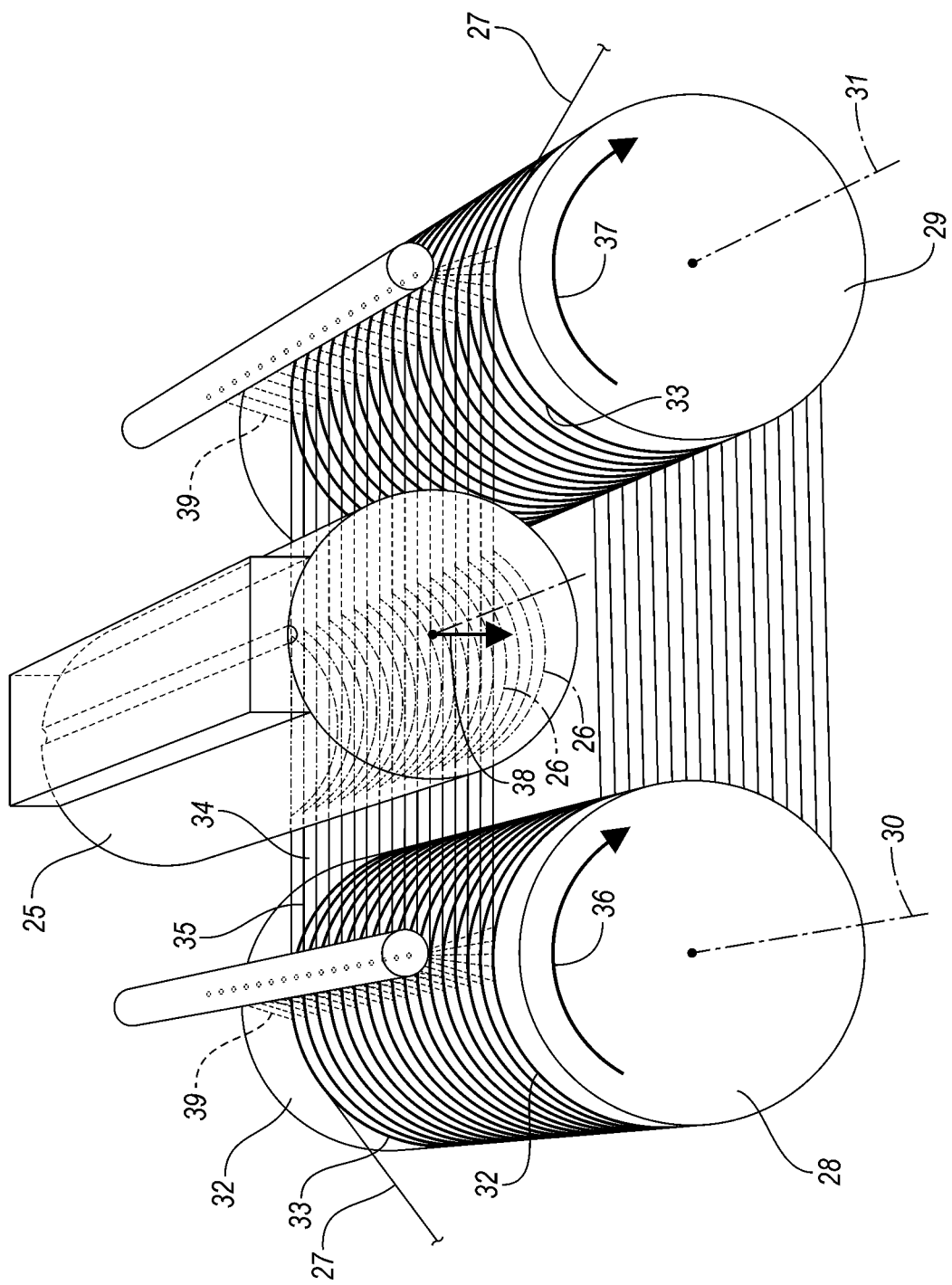
FIG. 6 roughly illustrates a prior art wafer slicing apparatus.

FIG. 2 shows the measurement curve 5 of the tensile force F (in newtons, N) measured in the wire web against the position of the respectively measured wire section in the web, GP (in millimeters, mm), the fresh wire supply side lying at 0 mm and the old wire discharge side of the wire web lying at 400 mm. The outstanding web positions GP1 and GP2, which are referred to in FIG. 5, are marked.

The force curve 5 does not extend monotonically decreasingly from the fresh wire supply side to the old wire discharge side, as is to be expected merely because of the wire wear, but has a minimum 20 which is given by details of the selected cutting process according to the reciprocating method, in particular the length of the wire forward and backward movements.

Figure 3:
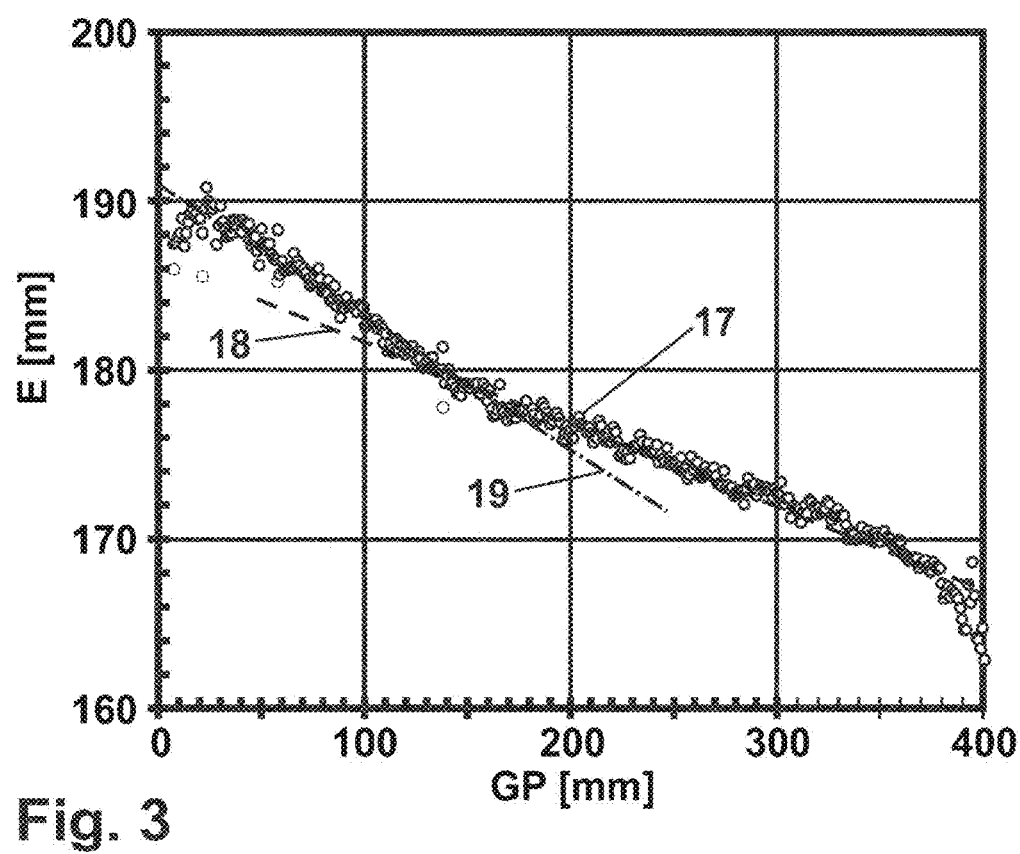
FIG. 3 shows a measurement curve of the effective diameter of the structured wire against a measurement position in the wire web.

FIG. 3 shows the measurement curve 17 of the effective diameter E (diameter of the envelope, in millimeters, mm) of the structured wire against the measurement position GP in the wire web.

It can be seen clearly that the effective diameter E of the structured wire, in contrast to a plain wire, the cross section of which decreases proportionally to the cumulative cutting volume (i.e. proportionally to the web position GP), is subject to multistage wear, namely at first (regression line 19) more rapid wear, then subsequently (regression line 18) slower wear—of the structuring.

Measurements of the wire cross section by means of two crossed optical micrometers on wire sections from the different web positions GP have shown that the rapid wear 19 is dominated by selective material erosion of the exposed tips of the crimps, while after this "decapping" of the crimp chips, during the subsequent wear 18, wear of the core wire distributed more uniformly over the entire surface dominates.

Figure 4:
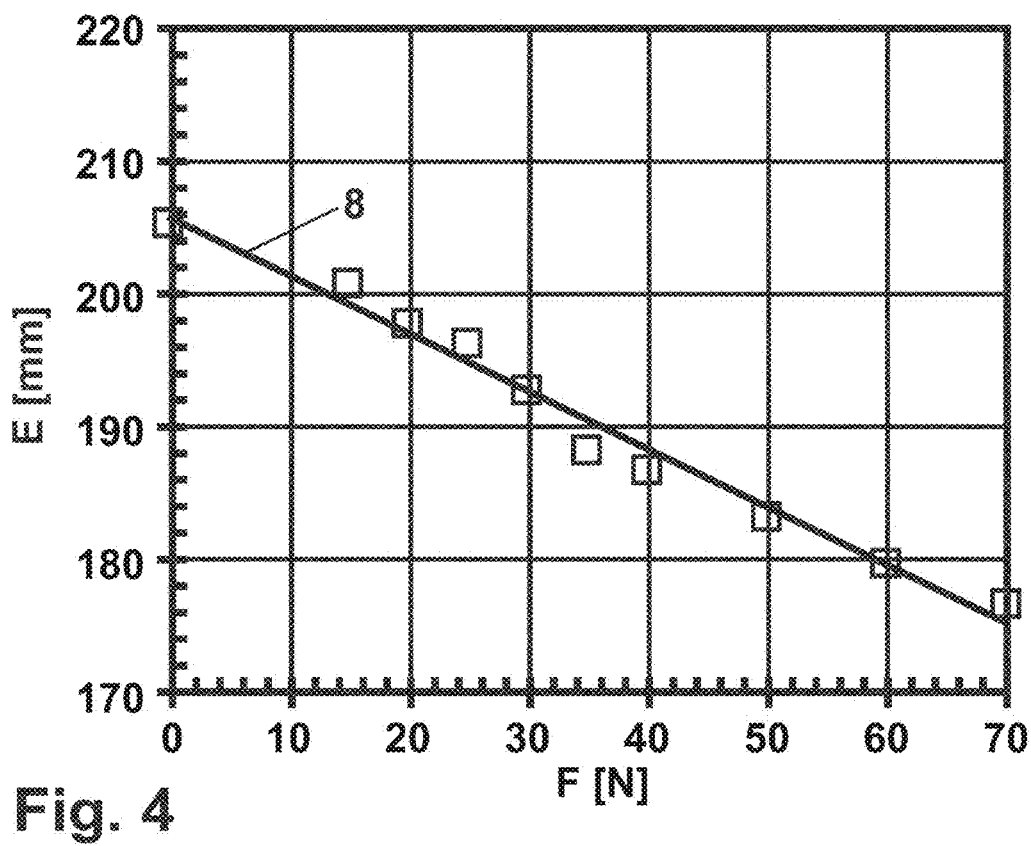
FIG. 4 shows a measurement curve of the effective diameter of the structured wire against the tensile force.

FIG. 4 shows the measurement curve 8 of the effective diameter E of the structured wire against the tensile force F (in newtons, N) to which the structured wire was subjected in a measuring arrangement.

It is found that the tension/extension curve 8 extends substantially linearly over large parts of the force. The slope of the tension/extension curve 8 is referred to as the spring constant of the structured wire in its longitudinal direction.

FIG. 5 shows the detail of a wire guide roll 14 at two web positions, GP1 and GP2 (cf. FIG. 2), with grooves 9 and 10 according to the invention.

Each groove is composed of a groove bottom 16 and a groove side 15. The groove bottom 16 is the part of the groove which has the shortest radial distance from the axis 21 of the wire guide roll 14. The wire bears on the groove bottom 16 because of its tensile stress in the longitudinal direction and winding around the wire guide roll 14 with a force, while it does not touch the groove sides 15.

In the groove 9, at web position GP1, the wire has an effective diameter EF1 because of the degree of its wear existing there and the wire tension prevailing there; in the groove 10, at position GP2, it correspondingly has an effective diameter EF2.

According to the invention, the radius of curvature of the groove bottom 16 is respectively adapted to the actual effective diameter of the structured wire 2 in the respective groove.

It has proven advantageous for the depths 6 and 7 of the grooves additionally to be selected respectively so that the outer sides of the wire effective diameters EF1 and EF2 respectively lie in a plane 13.

In this case, the depth refers to the shortest radial distance of the groove from the axis 21 of the wire guide roll 14.

The aperture angles 11 and 12 of the sides 15 and 16 of the grooves 9 and 10 may be equal, or alternatively different to one another. When particularly thin wafers are intended to be cut from the ingot, neighboring grooves preferably have a particularly small distance from one another.

In the case of deep grooves, an aperture angle decreasing with a decreasing groove spacing may be necessary for design reasons, when a sufficiently wide section of ungrooved lateral cylinder surface 22 of the wire guide roll 14 is intended to remain between adjacent grooves so that the wire is still guided reliably in the grooves and does not accidentally jump into neighboring grooves.

The effective diameter (diameter of its envelope) of a structured wire 2 is dependent on the tensile force F under which the structured wire is placed in the longitudinal direction.

For an example wire with a core diameter of 175 μm of the plain wire 1 on which it is based, the effective diameter decreased from about 205 μm to 176 μm from F=0 N (free of force) to F=70 N (tensile force close to the tensile strength of the wire, which is 75 N-80 N).

For tensile forces which are much less than the tensile strength, the decrease of the effective diameter takes place approximately proportionally to the tensile force. The structured wire 2 then behaves approximately like an ideal spring.

FIG. 4 represents the measured relationship between tensile force F and effective diameter E for a 175 μm example wire. In contrast to a structured wire 2, a plain wire 1 has no measurable diameter change in response to a change in tensile force.

The effective diameter was determined with a mechatronic thickness gauge with a wide measurement plate (in order respectively to include the contact points between the wire and the measuring gauge with the greatest distance) at a plurality of positions and under a plurality of rotation angles of the structured wire 2 with the specified wire longitudinal tension.

The effective diameter of a structured wire 2 changes with wear of the wire.

The material loss of a plain wire takes place by wear proportionally to the cutting volume.

The cutting volume relates to the volume of workpiece material (ingot material) which the tool (wire and abrasives) has cut so as to remove material.

The ratio of material loss (wire) and cutting volume (workpiece, ingot) forms a constant in the case of the plain wire 1.

The constant of proportionality is determined, inter alia, by the properties of the hard materials used (hardness, grain size, grain size distribution, grain shape, etc.).

It has been observed that, in contrast to the wear of a plain wire, the decrease of the effective diameter of a structured wire 2 does not proceed proportionally to the cutting volume. Instead, diameter measurements which were carried out on structured wires 2 in the fresh state and worn to different degrees by means of crossed optical micrometers (diameter measurement simultaneously in two wire transfers directions situated perpendicular to one another), showed that the plain wire 1 on which the structured wire 2 was based decreased approximately uniformly (proportionally to the cutting volume), but the amplitude of the crimps decreased non-proportionally to the cutting volume.

In the case of an example wire cutting method, a total length of 58 km of a structured wire with a diameter of 175 μm of the fresh core wire and an effective diameter of 191 μm of the fresh structured wire under a tensile force of 33 N in the longitudinal direction was fed to a wire web having 321 grooves, and a 360 mm long circular-s cylindrical ingot with a diameter of 300 mm of monocrystalline silicon was cut into 322 wafers.

The abrasive cutting was carried out by the reciprocating method, in each reciprocating step the wire being fed at 30 N to the wire web on the fresh wire side and moved through 320 m from the fresh wire spool to the old wire spool; it was subsequently fed at 30 N to the wire web on the old wire side and moved through 211 m from the old wire spool to the fresh wire spool.

The effective and core diameters of the structured wire were measured with the optical micrometer as a function of the web position GP after stopping the abrasive wire cutting process.

The result is shown by FIG. 3. The volume of workpiece material cut by the structured wire in the cutting kerfs (cutting volume) is proportional to the wire position GP in the web (cumulative cutting volume as far as this web/wire position).

The tensile force of 33 N resulted from 30 N with which the fresh wire was fed to the web, and the further 3 N were calculated from the observed bending of the wire during the abrasive cutting in the ingot feed direction using the spring constant, which is given by the relationship of the effective diameter against the longitudinal tensile force (FIG. 4).

The wire bending results from the force which the wire must exert on the ingot so that material erosion is achieved by movement of the wire relative to the ingot and supply of the abrasive slurry. It is also dependent on the speed of the wire feed (material removal rate), and was about 6 mm in the abrasive cutting process selected in the example.

In addition, the force exerted on the wire in the ingot feed direction was also determined by means of a triaxial force sensor based on piezo elements, which was to be mounted between the ingot and the device for feeding the ingot onto the wire web.

The wire longitudinal tension is not constant over the wire web. It has been observed that the tension of the wire in the wire web varies as a function of the position in the axial direction of the wire guide roll 14 (web position GP). The relationship was found to be non-linear.

The result of the measurement of the specified example wire and example abrasive cutting process is shown by FIG. 2.

The wire tension was determined with a tensile stress measuring instrument. The wire guide rolls used for the purpose of measurement had a right circular-cylindrical shape of their functional surfaces, which were made of polyurethane, and the polyurethane coating was provided with grooves identical in shape and depth with spacings from one another decreasing with the decrease in the wire effective diameter from the fresh wire side to the old wire side. The axes of the wire guide rolls 14 were arranged parallel to one another.

It was found, in particular, that the profile of the wire tension depended not only on the known details of the wire guide roll 14 (shape, groove depth) and the wire wear (diameter decrease, winding lengths around the wire guide rolls), but in particular also on the choice of the lengths of the wire movement during the reciprocating method.

In particular, a local minimum 20 of the measured curve of the profile of the wire tensile force F in the wire web against the web position GP was observed (FIG. 2).

The widths of the grooves in the wire guide rolls 14 must correspond at all positions of the wire web to the effective diameter of the structured wire 2.

Tests with cylindrical wire guide rolls 14 with grooves of equal depth but different widths revealed that a groove with a width which is less than the effective diameter of the structured wire in this groove wears particularly rapidly, gives wafers cut there with poor planarity and leads more often to wire breaks.

It has likewise been observed that although a groove which is more than 50% wider than the effective diameter of the structured wire 2 in this groove, wears more slowly, it nevertheless likewise leads to wafers cut there with poor planarity, probably because a wide groove does not guide the wire reliably through the ingot over a maximally planar surface during the cutting process.

Only a groove with a groove bottom whose curvature diameter is equal to or at most 50% larger than the effective diameter of the structured wire 2 extending through it, with the degree of wear of the wire existing there and the wire tension prevailing there, allows both low groove wear and a degree of plane-parallelism of the front and back sides of the respectively obtained wafers which is required for demanding applications.

Figure 7:
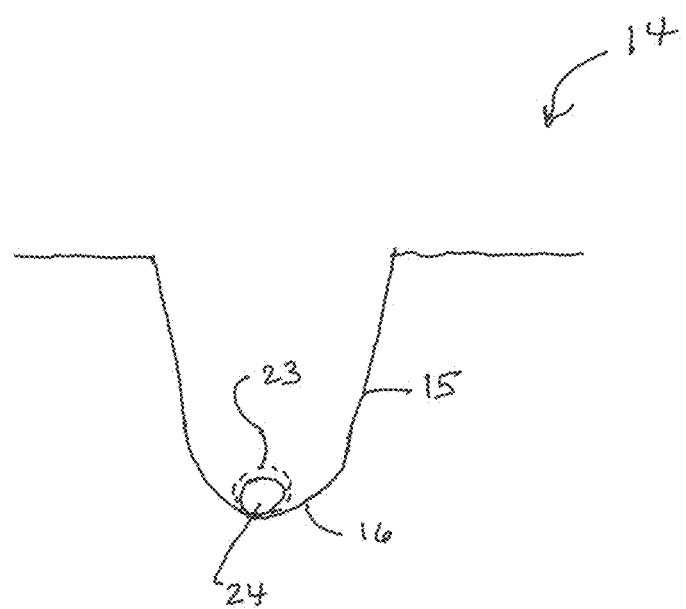
FIG. 7 illustrates an embodiment where the radius of the groove bottom is 1.5 times the radius of the envelope of the structured wire.

This gave rise to the feature according to the invention, according to which the bottom of each groove, on which the structured wire 2 bears, has a radius of curvature which for each groove is equal to or up to 1.5 times as large as the radius of the envelope of the structured wire, which the structured wire 2 has in the respective groove. As shown in FIG. 7, the radius of the bottom 16 of the groove with side walls 16 is 1.5 times the radius of the envelope 23 of the structured sawing wire 24 (not to scale).

The preceding description of exemplary embodiments is to be understood as exemplary. The disclosure thereby made allows the person skilled in the art on the one hand to understand the present invention and the advantages associated therewith, and on the other hand also includes variations and modifications of the described structures and methods which are obvious within the understanding of the person skilled in the art. Such variations and modifications, and equivalents, are therefore all meant to be covered by the protective scope of the claims.

The invention claimed is:

1. A method for simultaneously cutting a multiplicity of wafers from an ingot, comprising:
    moving the ingot through a wire web of a structured sawing wire having a longitudinal direction and consisting of a single strand of a plain core wire having a round cross-section and a multiplicity of indentations and protrusions of the plain core wire perpendicular to the longitudinal direction of the plain core wire, the outer radial extent of the indentations and protrusions defining a cross-sectional envelope of the structured sawing wire,
    wherein the structured sawing wire is spanned between two co-rotating wire guide rolls having grooves, and an abrasive slurry is applied to the wire web, and
    wherein the grooves of the two co-rotating wire guide rolls have groove bottoms, and wherein the bottom of each groove on which the structured sawing wire bears is curved with a radius of curvature is equal to or up to 1.5 times as large as the radius of the cross-sectional envelope the structured sawing wire which is in the respective groove.

2. The method of claim 1, wherein the indentations and protrusions point on average over the longitudinal direction of the structured sawing wire in all planes perpendicular to the longitudinal direction and are formed by means of structuring of the plain core wire in a plane perpendicular to the longitudinal direction and torsioning of the structured sawing wire about the longitudinal axis of the structured sawing wire, so that a twisted structured sawing wire thus formed has the shape of a helix.

3. The method of claim 1, wherein the structured sawing wire is guided spirally under a tension acting perpendicularly to a bottom surface of the cross-sectional envelope in the grooves around the wire guide rolls, such that a plane web of sections of the structured sawing wire extending parallel to one another is formed between the two wire guide rolls.

4. The method of claim 1, wherein the plain core wire has a diameter of from 130 µm to 175 µm.

5. The method of claim 4, wherein the diameter of the cross-sectional envelope of the structured sawing wire is from 1.02 to 1.25 times the diameter of the core wire.

6. The method of claim 1, wherein the cross-sectional envelope of the structured sawing wire has a diameter of from 1.02 to 1.25 times the diameter of the plain core wire.

7. The method of claim 1, wherein the shortest distance of each individual groove from the axis of the wire guide roll is selected such that all points of the cross-sectional envelope of the structured sawing wire with the greatest distance from the axis of the wire guide roll in each groove have the same distance from the axis of the wire guide roll.

8. The method of claim 1, wherein the envelope of the structured sawing wire is reduced when tension of the structured sawing wire is increased.

9. The method of claim 1, wherein the indentations and protrusions of the structured sawing wire exhibit a spacing in the longitudinal direction defining a wavelength, and the wavelength is different along at least two lengths of the structured sawing wire.

10. The method of claim 1, wherein the indentations and protrusions have an amplitude from a longitudinal axis of the structured sawing wire and the amplitude changes at least once in the longitudinal direction.

11. The method of claim 1, wherein sides of the grooves extending from the bottom of the outwards from an axis of the wire guide rolls define a V shape with an included angle of 60° to 130°.

* * * * *